(12) United States Patent
Rodrigues et al.

(10) Patent No.: US 7,666,963 B2
(45) Date of Patent: Feb. 23, 2010

(54) HYBRID COPOLYMERS

(75) Inventors: Klin A. Rodrigues, Signal Mountain, TN (US); Darin K. Griffith, Chattanooga, TN (US)

(73) Assignee: Akzo Nobel N.V., Arnhem (NL)

( * ) Notice: Subject to any disclaimer, the term of this patent is extended or adjusted under 35 U.S.C. 154(b) by 601 days.

(21) Appl. No.: 11/458,180

(22) Filed: Jul. 18, 2006

(65) Prior Publication Data

US 2007/0021577 A1 Jan. 25, 2007

Related U.S. Application Data

(60) Provisional application No. 60/701,380, filed on Jul. 21, 2005.

(51) Int. Cl.
*C08F 2/38* (2006.01)
(52) U.S. Cl. .................. 526/200; 526/286; 526/288; 526/318.2; 526/318.4; 526/318.6
(58) Field of Classification Search .............. 526/200, 526/286, 288, 318.2, 318.4, 318.6
See application file for complete search history.

(56) References Cited

U.S. PATENT DOCUMENTS

| | | | |
|---|---|---|---|
| 3,518,176 A * | 6/1970 | Russell et al. ............... 522/89 |
| 4,322,472 A * | 3/1982 | Kaspar et al. .............. 428/350 |
| 4,963,629 A | 10/1990 | Driemel et al. | |
| 5,032,659 A | 7/1991 | Heidel | |
| 5,223,171 A | 6/1993 | Jost et al. | |
| 5,227,446 A | 7/1993 | Denzinger et al. | |
| 5,296,470 A | 3/1994 | Vaslin et al. | |
| 5,304,620 A | 4/1994 | Holtmyer et al. | |
| 5,326,864 A | 7/1994 | Besemer et al. | |
| 5,580,941 A | 12/1996 | Krause et al. | |
| 5,854,191 A | 12/1998 | Krause et al. | |
| 5,854,321 A | 12/1998 | Krause et al. | |
| 6,103,839 A * | 8/2000 | Patel et al. ................ 526/65 |

FOREIGN PATENT DOCUMENTS

EP 00438215 A1 1/1991

OTHER PUBLICATIONS

Kroschwitz, J.I.; Concise Encyclopedia of Polymer Science & Engineering, Ed., Wiley-Interscience, New York, p. 436 (1990).
Odian, George; Principles of Polymerization, 2nd Ed., Wiley-Interscience, New York, p. 424 (1981).
Mark, Herman F.; Encyclopedia of Polymer Science & Technology, 3rd Ed., vol. 11, Wiley-Interscience, New York, p. 380 (2004).

* cited by examiner

*Primary Examiner*—Bernard Lipman
(74) *Attorney, Agent, or Firm*—James C. Abruzzo; Ralph J. Mancini

(57) ABSTRACT

Hybrid copolymers for use as anti-scalant and dispersant. The polymers are useful in compositions used in aqueous systems. The polymers include at least one synthetic monomeric constituent that is chain terminated by a naturally occurring hydroxyl containing moiety. A process for preparing these hybrid copolymers is also provided.

26 Claims, 1 Drawing Sheet

Na PAA   Polymer 1   Polymer 4   Control

HYBRID COPOLYMERS

CROSS REFERENCE TO RELATED APPLICATIONS

This application claims the benefit of U.S. Provisional Application No. 60/701,380, filed 21 Jul. 2005.

BACKGROUND OF THE INVENTION

1. Field of the Invention

The present invention relates to hybrid copolymers of synthetic and naturally derived materials. More particularly, the present invention is directed towards chain transfer agents formed from hydroxyl-containing naturally derived materials for use during production of synthetic polymers to produce those hybrid copolymers. The present invention also relates to anti-scalant and/or dispersant formulations or compositions including such polymers and their use in aqueous systems, including scale minimization.

2. Background Information

Many aqueous industrial systems require various materials to remain in a soluble, suspended or dispersed state. Examples of such aqueous systems include boiler water or steam generating systems, cooling water systems, gas scrubbing systems, pulp and paper mill systems, desalination systems, fabric, dishware and hard surface cleaning systems, as well as downhole systems encountered during the production of gas, oil, and geothermal wells. Often the water in those systems either naturally or by contamination contains ingredients such as inorganic salts. These salts can cause accumulation, deposition, and fouling problems in aqueous systems such as those mentioned above.

Inorganic salts are typically formed by the reaction of metal cations (e.g., calcium, magnesium or barium) with inorganic anions (e.g., phosphate, carbonate or sulfate). When formed, the salts tend to be insoluble or have low solubility in water. As their concentration in solution increases or as the pH and/or temperature of the solution containing those salts changes, the salts can precipitate from solution, crystallize and form hard deposits or scale on surfaces. Such scale formation is a problem in equipment such as heat transfer devices, boilers, secondary oil recovery wells, and automatic dishwashers, as well as on substrates washed with such hard waters, reducing the performance and life of such equipment.

In addition to scale formation many cooling water systems made from carbon steel, including industrial cooling towers and heat exchangers, experience corrosion problems. Attempts to prevent this corrosion are often made by adding various inhibitors such as orthophosphate and/or zinc compounds to the water. However, phosphate addition increases the formation of highly insoluble phosphate salts such as calcium phosphate. The addition of zinc compounds can lead to precipitation of insoluble salts such as zinc hydroxide and zinc phosphate.

Other inorganic particulates such as mud, silt and clay can also be commonly found in cooling water systems. These particulates tend to settle onto surfaces, thereby restricting water flow and heat transfer unless they are effectively dispersed.

Stabilization of aqueous systems containing scale-forming salts and inorganic particulates involves a variety of mechanisms. Inhibition is one conventional mechanism for eliminating the deleterious effect of scale-forming salts. In inhibition, synthetic polymer(s) are added that increase the solubility of the scale-forming salt in the aqueous system.

Another stabilization mechanism is the dispersion of precipitated salt crystals. Synthetic polymers having carboxylic acid groups function as good dispersants for precipitated salts such as calcium carbonates. In this mechanism, the crystals stay dispersed rather than dissolving in the aqueous solution.

A third stabilization mechanism involves interference and distortion of the crystal structure of the scale by the polymer, thereby making the scale less adherent to surfaces, other forming crystals and/or existing particulates.

Synthetic polymers can also impart many useful functions in cleaning compositions. For example, they can function either independently or concurrently as viscosity reducers in processing powdered detergents. They can also serve as anti-redeposition agents, dispersants, scale and deposit inhibitors, crystal modifiers, and/or detergent assistants capable of partially or completely replacing materials used as builders while imparting optimum detergent action properties to surfactants.

Cleaning formulations contain builders such as phosphates and carbonates for boosting their cleaning performance. These builders can precipitate out insoluble salts such as calcium carbonate and calcium phosphate in the form of calcium orthophosphate. The precipitants form deposits on clothes and dishware that results in unsightly films and spots on these articles. Similarly, insoluble salts cause major problem in down hole oil field applications. Hence, there is a need for polymers that will minimize the scaling of insoluble salts in water treatment, oil field and cleaning formulations.

Synthetic polymers have been used to minimize scale formation in aqueous treatment systems for a number of years. However, there has been a shortage of monomers to produce these synthetic polymers lately due to rising demand and tight crude oil supplies. Hence, there is a need to replace these synthetic polymers with hybrid polymers that are at least partially derived from renewal natural sources. Also, polymers from renewal natural sources should have a better biodegradable profile than synthetic polymers, which tend to have very little biodegradability.

A number of attempts have been made in the past to use natural materials as polymeric building blocks. These have mainly centered on grafting natural materials like sugars and starches with synthetic monomers. For example, U.S. Pat. Nos. 5,854,191, 5,223,171, 5,227,446 and 5,296,470 disclose the use of graft copolymers in cleaning applications.

Graft copolymers are produced by selectively generating initiation sites (e.g., free radicals) for the growth of monomer side chains from the saccharide or polysaccharide backbone (CONCISE ENCYCLOPEDIA OF POLYMER SCIENCE AND ENGINEERING, J. I. Kroschwitz, ed., Wiley-Interscience, New York, p. 436 (1990)). These grafting techniques typically use Fe(II) salts such as ferrous sulfate or Ce(IV) salts (e.g., cerium nitrate or cerium sulfate) to create those initiation sites on the saccharide or polysaccharide backbone (see, e.g., U.S. Pat. No. 5,304,620). Such redox processes are not easily controlled, are inefficient and generate unwanted homopolymers. Also, cerium salts tend to be left in the resulting solution as unwanted byproducts, thereby presenting a potential negative effect on performance. Therefore, there is a need for natural materials as polymeric building blocks that do not provide those problems associated with graft copolymers.

SUMMARY OF THE INVENTION

The present invention discloses hybrid copolymers compositions derived from synthetic monomers chain terminated with a hydroxyl containing natural material. By using a hydroxyl containing natural material as the chain transfer agent, the molecular weight of the resultant polymer can be controlled, especially if the chain transfer agent is low in molecular weight. Further, no special initiation system is required, unlike graft copolymers. As noted above, graft copolymers typically require special redox initiating systems containing metallic ions. In contrast, hybrid copolymers according to the present invention use conventional free radical initiating systems.

The materials are also structurally different than graft copolymers disclosed in the art. Graft copolymers are defined as a backbone of one monomer or polymer and one or more side chains derived from another monomer(s) attached on to the backbone (Odian, George, PRINCIPLES OF POLYMERIZATION, $2^{nd}$ ed., Wiley-Interscience, New York, p. 424 (1981)). Graft copolymers (such as those described in U.S. Pat. Nos. 5,854,191, 5,223,171, 5,227,446 and 5,296,470) typically have a natural polymer backbone and short side chains derived from synthetic monomers. In contrast, the hybrid copolymers of the present invention have long chains of synthetic monomers that incorporate a moiety derived from natural material at the end of the chain. From Mark, Herman F., ENCYCLOPEDIA OF POLYMER SCIENCE AND TECHNOLOGY, $3^{rd}$ ed., Vol. 11, Wiley-Interscience, New York, p. 380 (2004), fragments of a chain transfer agent are incorporated into polymer chains as end groups. A transfer reaction can therefore be used to introduce specific end groups into the polymeric material.

These hybrid copolymers are effective at minimizing a number of different scales, including phosphate, sulfonate, carbonate and silicate based scales. These scale-minimizing polymers are useful in a variety of systems, including water treatment compositions, oil field related compositions, cement compositions, cleaning formulations and other aqueous treatment compositions. Polymers according to the present invention have been found to be particularly useful in minimizing scale by inhibition of scale formation, dispersion of precipitants, and interference and distortion of crystal structure.

It has now been found that hydroxyl containing naturally derived materials can be used as chain transfer agents during the production of synthetic polymers, thereby producing novel hybrid polymeric materials. These hydroxyl containing naturally derived materials include glycerol, citric acid and gluconic acid, as well as monosaccharides, oligosaccharides and polysaccharides such as sugars, maltodextrins and starches. The resulting materials have the performance properties of synthetic polymers but use lower cost, readily available and environmentally friendly materials derived from renewable sources. These materials can be used in water treatment, detergent, oil field and other dispersant applications.

When present in aqueous treatment compositions, the hybrid copolymer is present in an amount of about 0.001% to about 25% by weight of the aqueous treatment composition. In another aspect, the polymer is present in an amount of about 0.5% to about 5% by weight of the composition.

In one aspect, the number average molecular weight of the hybrid copolymer is between about 1000 and about 100,000. In another aspect, the number average molecular weight of the polymer is between about 2000 and about 25,000.

The hybrid copolymer is useful in cleaning formulations. In such formulations the polymer is present in an amount of about 0.01% to about 10% by weight of the cleaning formulation. These cleaning formulations can include phosphorus-based and/or carbonate builders. The cleaning formulations include automatic dishwashing detergent formulations. Automatic dishwashing detergent formulation can also have ingredients such as builders, surfactants, enzymes, solvents, hydrotropes, fillers, bleach, perfumes and/or colorants.

The hybrid copolymer is also useful in water treatment systems for preventing calcium carbonate and phosphate scales. In such systems, the polymer is present in an amount of at least about 0.5 mg/L. The hybrid copolymer is also useful in water treatment compositions or formulations for preventing calcium scales in a water treatment system. In those water treatment compositions the polymer is present in an amount of about 10% to about 25% by weight of the composition.

The present invention further provides for a mineral dispersant having the hybrid copolymer. This dispersant is able to disperse a variety of minerals such as talc, titanium dioxide, mica, precipitated calcium carbonate, ground calcium carbonate, precipitated silica, silicate, iron oxide, clay, kaolin clay or combinations thereof.

In another aspect, the hybrid copolymer can be used in a treatment composition for aqueous systems for minimizing carbonate and/or sulfate scale.

In another application, the hybrid copolymer can be used in an aqueous treatment system such as a water treatment system, oilfield system or cleaning system. When the aqueous treatment system is an oilfield system, the sulfate scale minimized can be barium sulfate scale.

In yet even another application, the hybrid copolymer can be used as a binder for fiberglass. Fiberglass insulation products are generally formed by bonding glass fibers together with a polymeric binder. Typically, an aqueous polymer binder is sprayed onto matted glass fibers soon after they have been formed and while they are still hot. The polymer binder tends to accumulate at the junctions where fibers cross each other, thereby holding the fibers together at these points. Heat from the hot fibers vaporizes most of the water in the binder. The fiberglass binder must be flexible so that the final fiberglass product can be compressed for packaging and shipping and later recover to its full vertical dimension when installed.

Accordingly, the present invention provides a method of preparing a hybrid copolymer wherein a monomeric solution and a naturally derived hydroxyl containing chain transfer agent are polymerized in the presence of an initiator solution. The initiator solution is not a metal ion based redox system. The monomeric solution is present in an amount of from about 25% to about 99.9% by weight and the chain transfer agent is present in an amount of from about 0.1% by weight to about 75% by weight, based on total weight of the copolymer.

The present invention also provides a hybrid copolymer having a synthetic polymer as the backbone of the copolymer, and a naturally derived hydroxyl containing polymer as the chain terminating portion of the copolymer.

The present invention is further directed towards a water treatment composition for use in preventing carbonate and phosphate scales in a water treatment system comprising the above described hybrid copolymer, wherein the polymer is present in the composition in an amount of about 10% to about 25% by weight of the composition.

The present invention is further directed towards a cleaning formulation comprising the above described hybrid copolymer, wherein the polymer is present in an amount of about 0.01% to about 10% by weight of the cleaning formulation. The cleaning formulation can include one or more phosphorus-based and/or carbonate builders. The cleaning formulation can include one or more surfactants.

The cleaning formulations include automatic dishwashing detergent formulations. These automatic dishwashing detergent formulations can also include builders, surfactants, enzymes, solvents, hydrotropes, fillers, bleach, perfumes and/or colorants.

The cleaning formulations also include powdered or liquid or unit dose detergent formulations.

The above described hybrid copolymer can be used in mineral dispersants. Mineral dispersants include those that disperse minerals such as talc, titanium dioxide, mica, precipitated calcium carbonate, ground calcium carbonate, precipitated silica, silicate, iron oxide, clay, kaolin clay or combinations thereof.

The above described hybrid copolymer can be used in aqueous system treatment composition, wherein the aqueous system treatment composition is able to modify calcium carbonate crystal growth in an aqueous system. Examples of aqueous systems include water treatment systems, oilfield systems or cleaning systems. In another aspect, the aqueous system treatment composition is able to minimize sulfate scale. In a further aspect the aqueous system can be an oilfield system and the sulfate scale minimized is barium sulfate scale.

The above described hybrid copolymer can further be used in a binder for fiberglass. It can also be used in a superabsorbent or rheology modifier.

DETAILED DESCRIPTION OF THE INVENTION

Figure 1:
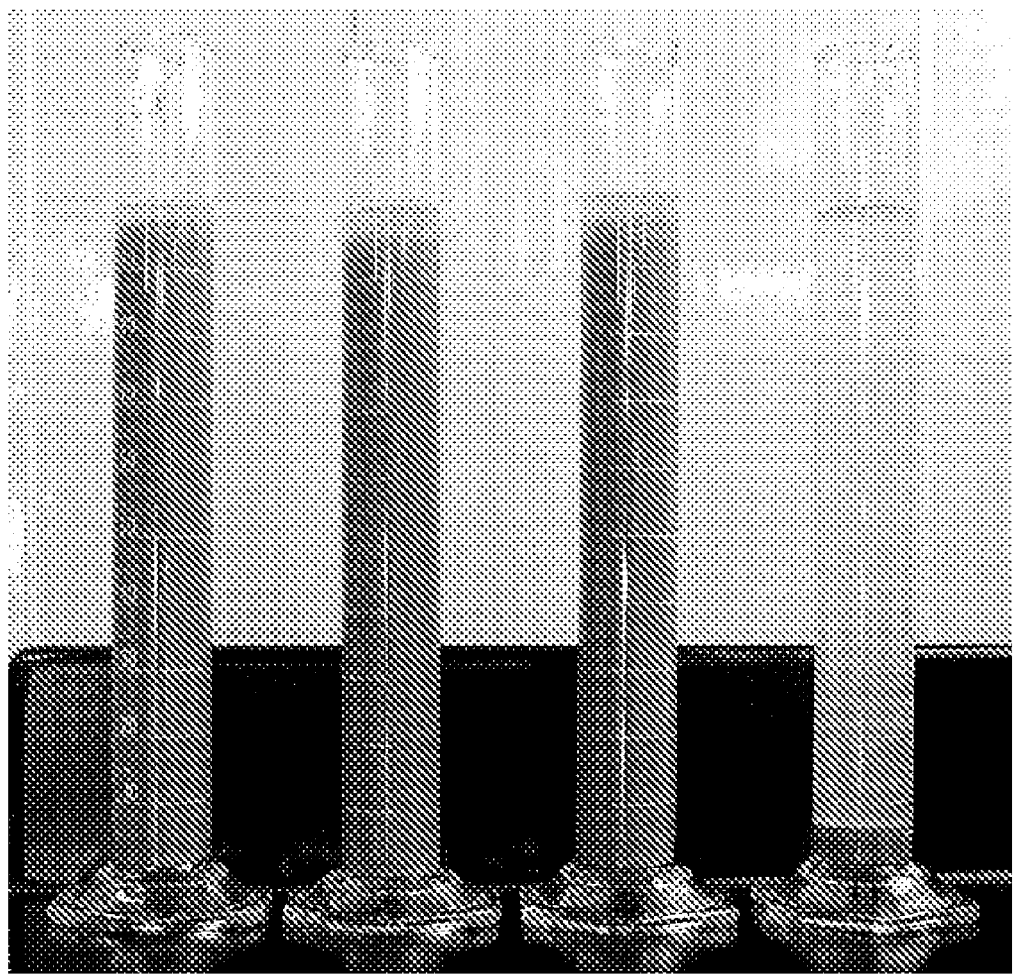
FIG. 1 ia a photograph illustrating the effect on dispersancy of clay suspensions utilizing polymers according to the present invention.

The hybrid copolymers according to the present invention are produced by using hydroxyl-containing naturally derived materials as chain transfer agents during the production process. These hydroxyl containing naturally derived materials range from small molecules such as glycerol, citric acid, lactic acid, tartaric acid, gluconic acid, glucoheptonic acid, monosaccharides and disaccharides such as sugars, to larger molecules such as oligosaccharides and polysaccharides (e.g., maltodextrins and starches). Examples of these include sucrose, fructose, maltose, glucose, and saccharose, as well as reaction products of saccharides such as mannitol, sorbitol and so forth. The chain transfer agents include oxidatively, hydrolytically or enzymatically degraded monosaccharides, oligosaccharides and polysaccharides, as well as chemically modified monosaccharides, oligosaccharides and polysaccharides. Such chemically modified derivatives include carboxylates, sulfonates, phosphates, phosphonates, aldehydes, silanes, alkyl glycosides, alkyl-hydroxyalkyls, carboxy-alkyl ethers and other derivatives.

Use of natural materials as a chain transfer agent is an attractive and readily available substitute for current synthetic materials. For example, glycerol is a by-product of biodiesel production. Glycerol is also a by-product of oils and fats used in the manufacture of soaps and fatty acids. It can also be produced by fermentation of sugar. Citric acid is produced industrially by fermentation of crude sugar solutions. Lactic acid is produced commercially by fermentation of whey, cornstarch, potatoes, molasses, etc. Tartaric acid is one byproduct of the wine making process.

Polysaccharides useful in the present invention can be derived from plant, animal and microbial sources. Examples of such polysaccharides include starch, cellulose, gums (e.g., gum arabic, guar and xanthan), alginates, pectin and gellan. Starches include those derived from maize and conventional hybrids of maize, such as waxy maize and high amylose (greater than 40% amylose) maize, as well as other starches such as potato, tapioca, wheat, rice, pea, sago, oat, barley, rye, and amaranth, including conventional hybrids or genetically engineered materials.

Also included are hemicellulose or plant cell wall polysaccharides such as D-xylans. Examples of plant cell wall polysaccharides include arabino-xylans such as corn fiber gum, a component of corn fiber. An important feature of these polysaccharides is the abundance of hydroxyl groups. These hydroxyl groups provide sites for chain transfer during the polymerization process. The higher the number of secondary and tertiary hydroxyl groups in the molecule the more effective it will be as chain transfer agent.

Other polysaccharides useful as chain transfer agents include maltodextrins, which are polymers having D-glucose units linked primarily by $\alpha$-1,4 bonds and have a dextrose equivalent ('DE') of less than about 20. Maltodextrins are available as a white powder or concentrated solution and are prepared by the partial hydrolysis of starch with acid and/or enzymes. In one aspect the chain transfer agents are glycerol, citric acid, maltodextrins and/or low molecular weight oxidized starches. Useful chain transfer agents according to the present invention have molecular weights of less than about 20,000. In another aspect, the chain transfer agents have molecular weights of less than about 2000. In even another aspect, chain transfer agents according to the present invention have molecular weights of less than 1000.

Polysaccharides can be modified or derivatized by etherification (e.g., via treatment with propylene oxide, ethylene oxide, 2,3-epoxypropyltrimethylammonium chloride), esterification (e.g., via reaction with acetic anhydride, octenyl succinic anhydride ('OSA')), acid hydrolysis, dextrinization, oxidation or enzyme treatment (e.g., starch modified with $\alpha$-amylase, $\beta$-amylase, pullanase, isoamylase or glucoamylase), or various combinations of these treatments.

The hydroxyl-containing naturally derived chain transfer agents can be used from about 0.1 to about 75 weight % based on total weight of the polymer. In one aspect, the range is from about 1 to about 50 weight % of chain transfer agents based on total weight of the polymer.

In one embodiment, the hybrid copolymers are prepared from at least one hydrophilic acid monomer as the synthetic constituent. Examples of such hydrophilic acid monomers include but are not limited to acrylic acid, methacrylic acid, ethacrylic acid, $\alpha$-chloro-acrylic acid, $\alpha$-cyano acrylic acid, $\beta$-methyl-acrylic acid (crotonic acid), $\alpha$-phenyl acrylic acid, $\beta$-acryloxy propionic acid, sorbic acid, $\alpha$-chloro sorbic acid, angelic acid, cinnamic acid, p-chloro cinnamic acid, $\beta$-styryl acrylic acid (1-carboxy-4-phenyl butadiene-1,3), itaconic acid, maleic acid, citraconic acid, mesaconic acid, glutaconic acid, aconitic acid, fumaric acid, tricarboxy ethylene, 2-acryloxypropionic acid, 2-acrylamido-2-methyl propane sulfonic acid, vinyl sulfonic acid, sodium methallyl sulfonate, sulfonated styrene, allyloxybenzene sulfonic acid and maleic acid. Moieties such as maleic anhydride or acrylamide that can be derivatized to an acid containing group can be used. Combinations of acid-containing hydrophilic monomers can also be used. In one aspect the acid-containing hydrophilic monomer is acrylic acid, maleic acid, methacrylic acid, 2-acrylamido-2-methyl propane sulfonic acid or mixtures thereof.

In addition to the hydrophilic monomers described above, hydrophobic monomers can also be used as the synthetic constituent. These hydrophobic monomers include, for example, ethylenically unsaturated monomers with saturated or unsaturated alkyl, hydroxyalkyl, alkylalkoxy groups, arylalkoxy, alkarylalkoxy, aryl and aryl-alkyl groups, alkyl sulfonate, aryl sulfonate, siloxane and combinations thereof. Examples of hydrophobic monomers include styrene, α-methyl styrene, methyl methacrylate, methyl acrylate, 2-ethylhexyl acrylate, octyl acrylate, lauryl acrylate, stearyl acrylate, behenyl acrylate, 2-ethylhexyl methacrylate, octyl methacrylate, lauryl methacrylate, stearyl methacrylate, behenyl methacrylate, 2-ethylhexyl acrylamide, octyl acrylamide, lauryl acrylamide, stearyl acrylamide, behenyl acrylamide, propyl acrylate, butyl acrylate, pentyl acrylate, hexyl acrylate, 1-vinyl naphthalene, 2-vinyl naphthalene, 3-methyl styrene, 4-propyl styrene, t-butyl styrene, 4-cyclohexyl styrene, 4-dodecyl styrene, 2-ethyl-4-benzyl styrene, and 4-(phenyl butyl) styrene. Combinations of hydrophobic monomers can also be used.

The polymerization process can be a solution or suspension process. The process involves polymerization using free radical initiators with one or more of the above hydrophilic and/or hydrophobic monomers, and the hydroxyl containing natural products used as chain transfer agents or chain stoppers. These chain transfer agents can be added either at the beginning of the reaction or during reaction as the monomer(s) is (are) added.

One advantage of this system is that it makes use of typical free radical initiators. Unlike grafting systems, special redox systems such as Ce(IV) salts are not required. Instead, easy-to-use thermally activated initiators such as sodium persulfate can be used. One skilled in the art will recognize that most initiating systems are applicable here.

A high degree of chain transfer can lead to crosslinking and formation of an insoluble gel. In one embodiment, this can be avoided by ensuring that monomer and initiator are fed over the same approximate period of time. If initiator feed lasts much longer than monomer feed, a crosslinked gel can form, particularly when oligopolysaccharides and polysaccharides (those having a molecular weight greater than about 1000) are used as the chain transfer agent.

As noted above, in some cases the reaction product forms a hybrid gel during manufacture of these hybrid copolymers. This is especially true if the synthetic monomer used is extremely reactive (e.g., acrylic acid reacted at low pH (protonated form)) or if the natural chain transfer agent has a molecular weight of greater than about 1000. A crosslinked gel starts to form after the monomer feed has ended and while the rest of the initiator is being fed in. This is undesirable in most cases, since the gel product cannot be diluted in water and therefore cannot be used in the applications described below. The exception to this is in the manufacture of super absorbents, rheology modifiers and gels used to treat wells in the oil field industry.

If an undesirable gel starts to form during the process due to a reactive monomer, it can be eliminated in a number of ways. This includes reducing monomer reactivity by neutralizing the monomer, illustrated in Example 10B (neutralizing the monomer during polymerization) herein below. As noted in Example 10A, sodium acrylate is far less reactive than acrylic acid and therefore does not form gels that acrylic acid may form. In another embodiment, additional chain transfer agents like thiols, sodium hypophosphite and alcohols can also be used. Thiols and alcohols (see, e.g., Example 10C herein below) are particularly useful in controlling molecular weight and preventing the formation of crosslinked gels. Finally, these gels can be eliminated by shortening the initiator feeds so that the initiator and monomer feeds are pumped over the same period of time (illustrated in Example 10A).

Stabilization of aqueous systems containing scale-forming salts and inorganic particulates involves a variety of mechanisms. Inhibition is one conventional mechanism for eliminating the deleterious effect of scale-forming salts. In inhibition, synthetic polymer(s) are added that increase the solubility of the scale-forming salt in the aqueous system.

Another stabilization mechanism is the dispersion of precipitated salt crystals. Synthetic polymers having carboxylic acid groups function as good dispersants for precipitated salts such as calcium carbonates. In this mechanism, the crystals stay dispersed rather than dissolving in the aqueous solution.

A third stabilization mechanism involves interference and distortion of the crystal structure of the scale by the polymer, thereby making the scale less adherent to surfaces, other forming crystals and/or existing particulates.

Hybrid copolymers according to the present invention provide excellent scale inhibition and deposition control under a wide variety of conditions. For instance, the inventive polymers have been found to minimize calcium carbonate scale formation and deposition by means of all three mechanisms defined above.

The inventive polymers are further effective at minimizing sulfate scale in oil field treatment applications. The hybrid copolymers are also highly effective at dispersing particulate matter such as minerals, clays, salts, metallic ores and metallic oxides. Specific examples include talc, titanium dioxide, mica, silica, silicates, carbon black, iron oxide, kaolin clay, titanium dioxide, calcium carbonate and aluminum oxide. These particulates can be found in a variety of applications such as coatings, plastics, rubbers, filtration products, cosmetics, food and paper coatings.

Water Treatment Systems

Water treatment includes prevention of calcium scales due to precipitation of calcium salts such as calcium carbonate, calcium sulfate and calcium phosphate. These salts are inversely soluble, meaning that their solubility decreases as the temperature increases. For industrial applications where higher temperatures and higher concentrations of salts are present, this usually translates to precipitation occurring at the heat transfer surfaces. The precipitating salts can then deposit onto the surface, resulting in a layer of calcium scale. The calcium scale can lead to heat transfer loss in the system and cause overheating of production processes. This scaling can also promote localized corrosion.

Calcium phosphate, unlike calcium carbonate, generally is not a naturally occurring problem. However, orthophosphates are commonly added to industrial systems (and sometimes to municipal water systems) as a corrosion inhibitor for ferrous metals, typically at levels between 2.0-20.0 mg/L. Therefore, calcium phosphate precipitation can not only result in those scaling problems previously discussed, but can also result in severe corrosion problems as the orthophosphate is removed from solution. As a consequence, industrial cooling systems require periodic maintenance wherein the system must be shut down, cleaned and the water replaced. Lengthening the time between maintenance shutdowns saves costs and is desirable.

It is advantageous to reuse the water in industrial water treatment systems as much as possible. Still, water can be lost over time due to various mechanisms such as evaporation. As a consequence, dissolved and suspended solids become more concentrated over time. Cycles of concentration refers to the number of times solids in a particular volume of water are concentrated. The quality of the water makeup determines how many cycles of concentration can be tolerated. In cooling tower applications where water makeup is hard (i.e., poor quality), 2 to 4 cycles would be considered normal, while 5 and above would represent stressed conditions. Hybrid copolymers according to the present invention perform particularly well under stressed conditions.

One way to lengthen the time between maintenance in a water treatment system is to use polymers that function in either inhibiting formation of calcium salts or in modifying crystal growth. Crystal growth modifying polymers alter the crystal morphology from regular structures (e.g., cubic) to irregular structures such as needlelike or florets. Because of the change in form, crystals that are deposited are easily removed from the surface simply by mechanical agitation resulting from water flowing past the surface. Hybrid copolymers of the present invention are particularly useful at inhibiting calcium phosphate based scale formation such as calcium orthophosphate. Further, these inventive polymers also modify crystal growth of calcium carbonate scale.

The polymers of the present invention can be added to the aqueous systems neat, or they can be formulated into various water treatment compositions and then added to the aqueous systems. In certain aqueous systems where large volumes of water are continuously treated to maintain low levels of deposited matter, the polymers can be used at levels as low as 0.5 mg/L. The upper limit on the amount of polymer used depends upon the particular aqueous system treated. For example, when used to disperse particulate matter the polymer can be used at levels ranging from about 0.5 to about 2,000 mg/L. When used to inhibit the formation or deposition of mineral scale the polymer can be used at levels ranging from about 0.5 to about 100 mg/L. In another embodiment the polymer can be used at levels from about 3 to about 20 mg/L, and in another embodiment from about 5 to about 10 mg/L.

Once prepared, the hybrid copolymers can be incorporated into a water treatment composition that includes the hybrid copolymer and other water treatment chemicals. These other chemicals can include, for example, corrosion inhibitors such as orthophosphates, zinc compounds and tolyltriazole. As indicated above, the amount of inventive polymer utilized in the water treatment compositions can vary based upon the treatment level desired for the particular aqueous system treated. Water treatment compositions generally contain from about 10 to about 25 percent by weight of the hybrid copolymer.

The hybrid copolymers can be used in any aqueous system wherein stabilization of mineral salts is important, such as in heat transfer devices, boilers, secondary oil recovery wells, automatic dishwashers, and substrates that are washed with hard water. The hybrid copolymer is especially effective under stressed conditions in which other scale inhibitors fail.

The hybrid copolymers can stabilize many minerals found in water, including, but not limited to, iron, zinc, phosphonate, and manganese. The polymers also disperse particulate found in aqueous systems.

Hybrid copolymers of the present invention can be used to inhibit scales, stabilize minerals and disperse particulates in many types of processes. Examples of such processes include sugar mill anti-scalant; soil conditioning; treatment of water for use in industrial processes such as mining, oilfields, pulp and paper production, and other similar processes; waste water treatment; ground water remediation; water purification by processes such as reverse osmosis and desalination; air-washer systems; corrosion inhibition; boiler water treatment; as a biodispersant; and chemical cleaning of scale and corrosion deposits. One skilled in the art can conceive of many other similar applications for which the hybrid copolymer could be useful.

Cleaning Formulations

The polymers of this invention can also be used in a wide variety of cleaning formulations containing phosphate-based builders. For example, these formulations can be in the form of a powder, liquid or unit doses such as tablets or capsules. Further, these formulations can be used to clean a variety of substrates such as clothes, dishes, and hard surfaces such as bathroom and kitchen surfaces. The formulations can also be used to clean surfaces in industrial and institutional cleaning applications.

In cleaning formulations, the polymer can be diluted in the wash liquor to the end use level. The polymers are typically dosed at 0.01 to 1000 ppm in the aqueous wash solutions. The polymers can minimize deposition of phosphate based scale in fabric, dishwash and hard surface cleaning applications. The polymers also help in minimizing encrustation on fabrics. Additionally, the polymers minimize filming and spotting on dishes. Dishes can include glass, plastics, china, cutlery, etc. The polymers further aid in speeding up the drying processes in these systems. While not being bound by theory, it is believed that the hydrophobic nature of these polymers aids in increasing the rate of drying on surfaces such as those described above.

Optional components in the detergent formulations include, but are not limited to, ion exchangers, alkalies, anti-corrosion materials, anti-redeposition materials, optical brighteners, fragrances, dyes, fillers, chelating agents, enzymes, fabric whiteners and brighteners, sudsing control agents, solvents, hydrotropes, bleaching agents, bleach precursors, buffering agents, soil removal agents, soil release agents, fabric softening agent and opacifiers. These optional components may comprise up to about 90% by weight of the detergent formulation.

The polymers of this invention can be incorporated into hand dish, autodish and hard surface cleaning formulations. The polymers can also be incorporated into rinse aid formulations used in autodish formulations. Autodish formulations can contain builders such as phosphates and carbonates, bleaches and bleach activators, and silicates. These formulations can also include other ingredients such as enzymes, buffers, perfumes, anti-foam agents, processing aids, and so forth. Autodish gel systems containing hypochlorite bleach are particularly hard on polymers due to the high pH required to maintain bleach stability. In these systems, hydrophobes without an ester group (e.g., aromatics) are particularly useful.

Hard surface cleaning formulations can contain other adjunct ingredients and carriers. Examples of adjunct ingredients include, without limitation, buffers, builders, chelants, filler salts, dispersants, enzymes, enzyme boosters, perfumes, thickeners, clays, solvents, surfactants and mixtures thereof.

One skilled in the art will recognize that the amount of polymer(s) required depends upon the cleaning formulation and the benefit they provide to the formulation. In one aspect, use levels can be about 0.01 weight % to about 10 weight % of the cleaning formulation. In another embodiment, use levels can be about 0.1 weight % to about 2 weight % of the cleaning formulation.

Oilfield Scale Application

Scale formation is a major problem in oilfield applications. Subterranean oil recovery operations can involve the injection of an aqueous solution into the oil formation to help move the oil through the formation and to maintain the pressure in the reservoir as fluids are being removed. The injected water, either surface water (lake or river) or seawater (for operations offshore) can contain soluble salts such as sulfates and carbonates. These salts tend to be incompatible with ions already present in the oil-containing reservoir (formation water). The formation water can contain high concentrations of certain ions that are encountered at much lower levels in normal surface water, such as strontium, barium, zinc and calcium. Partially soluble inorganic salts, such as barium sulfate and calcium carbonate, often precipitate from the production water as conditions affecting solubility, such as temperature and pressure, change within the producing well bores and topsides. This is especially prevalent when incompatible waters are encountered such as formation water, seawater, or produced water.

Barium sulfate and strontium sulfate form very hard, very insoluble scales that are difficult to prevent. Barium sulfate or other inorganic supersaturated salts can precipitate onto the formation forming scale, thereby clogging the formation and restricting the recovery of oil from the reservoir. The insoluble salts can also precipitate onto production tubing surfaces and associated extraction equipment, limiting productivity, production efficiency and compromising safety. Certain oil-containing formation waters are known to contain high barium concentrations of 400 ppm, and higher. Since barium sulfate forms a particularly insoluble salt, the solubility of which declines rapidly with temperature, it is difficult to inhibit scale formation and to prevent plugging of the oil formation and topside processes and safety equipment.

Dissolution of sulfate scales is difficult, requiring high pH, long contact times, heat and circulation, and can only be performed topside. Alternatively, milling and in some cases high-pressure water washing can be used. These are expensive, invasive procedures and require process shutdown. The hybrid copolymers of this invention can minimize sulfate scales, especially downhole sulfate scales.

Dispersant for Particulates

Polymers according to the present invention can be used as a dispersant for pigments in applications such as paper coatings, paints and other coating applications. Examples of pigments that can be dispersed by the inventive polymers include titanium dioxide, kaolin clays, modified kaolin clays, calcium carbonates and synthetic calcium carbonates, iron oxides, carbon black, talc, mica, silica, silicates, and aluminum oxide. Typically, the more hydrophobic the pigment the better polymers according to the present invention perform in dispersing particulates. These particulate matters are found in a variety of applications, including but not limited to, coatings, plastics, rubbers, filtration products, cosmetics, food and paper coatings.

Fiberglass Sizing

Fiberglass is usually sized with phenol-formaldehyde resins or polyacrylic acid based resins. The former has the disadvantage of releasing formaldehyde during end use. The polyacrylic acid resin system has become uneconomical due to rising crude oil prices. Hence, there is a need for renewal sizing materials in this industry. The hybrid polymers of this invention are a good fit for this application. They can be used by themselves or in conjunction with the with the phenol formaldehyde or polyacrylic acid binder system.

The binder composition is generally applied by means of a suitable spray applicator to a fiber glass mat as it is being formed. The spray applicator aids in distributing the binder solution evenly throughout the formed fiberglass mat. Solids are typically present in the aqueous solution in amounts of about 5 to 25 percent by weight of total solution. The binder can also be applied by other means known in the art, including, but not limited to, airless spray, air spray, padding, saturating, and roll coating.

Residual heat from the fibers volatizes water away from the binder. The resultant high-solids binder-coated fiberglass mat is allowed to expand vertically due to the resiliency of the glass fibers. The fiberglass mat is then heated to cure the binder. Typically, curing ovens operate at a temperature of from 130° C. to 325° C. However, the binder composition of the present invention can be cured at lower temperatures of from about 110° C. to about 150° C. In one aspect, the binder composition can be cured at about 120° C. The fiberglass mat is typically cured from about 5 seconds to about 15 minutes. In one aspect the fiberglass mat is cured from about 30 seconds to about 3 minutes. The cure temperature and cure time also depend on both the temperature and level of catalyst used. The fiberglass mat can then be compressed for shipping. An important property of the fiberglass mat is that it returns substantially to its full vertical height once the compression is removed. The hybrid polymer based binder produces a flexible film that allows the fiberglass insulation to bounce back after a roll is unwrapped for use in walls/ceilings.

Fiberglass or other non-wovens treated with the copolymer binder composition is useful as insulation for heat or sound in the form of rolls or batts; as a reinforcing mat for roofing and flooring products, ceiling tiles, flooring tiles, as a microglass-based substrate for printed circuit boards and battery separators; for filter stock and tape stock and for reinforcements in both non-cementatious and cementatious masonry coatings.

The following examples are intended to exemplify the present invention but are not intended to limit the scope of the invention in any way. The breadth and scope of the invention are to be limited solely by the claims appended hereto.

Example 1

Synthesis of Hybrid Copolymer

A reactor containing 200 grams of a 50% solution of citric acid (CA) (0.52 moles) as chain transfer agent was heated to 100° C. A monomer solution containing 238 grams of a 50% solution of sodium 2-acrylamido-2-methylpropane sulfonate (NaAMPS) (0.52 moles) was added to the reactor over a period of 1.5 hours. An initiator solution comprising 6.2 grams of sodium persulfate in 100 grams of deionized water was simultaneously added to the reactor over a period of 2 hours. The mole percent of citric acid chain transfer agent based on moles of citric acid and NaAMPS was 50%. The reaction product was held at 100° C. for an additional 2 hours. The final hybrid copolymer product was a golden yellow solution.

Example 2-4

Synthesis of Hybrid Copolymer

Example 1 was repeated but using lower amounts of citric acid as the chain transfer agent. The residual amount of citric acid left in solution was measured by liquid chromatography ("LC"). The amount of citric acid incorporated into the polymer was calculated by the difference of citric acid added to the initial charge and the residual amount measured by GC. The number average molecular weight (Mn) of these polymers was measured by gel permeation chromatography ("GPC").

TABLE 1

Varying amount of natural constituent during polymerization

| Example | Mole % CA based on total moles of CA + NaAMPS | Wt % of citric acid incorporated into the polymer | Mn |
|---|---|---|---|
| 1 | 50 | 6.4 | 3536 |
| 2 | 30 | 4 | 4867 |
| 3 | 20 | 1.2 | 6481 |
| 4 | 10 | 0.5 | 6256 |

The data indicates that the amount of citric acid incorporated into the copolymer increases as the mole % of CA based on total moles of CA+NaAMPS increases. Also, the molecular weight of the polymer decreases when increasing amounts of CA are added to the reaction. This lowering of molecular weight clearly demonstrates that citric acid is incorporated into the polymer as a chain transfer agent.

Example 5

Synthesis of Hybrid Copolymer

A reactor containing 200 grams of a 50% solution of citric acid (0.52 moles) and 212.4 grams of a 50% solution of NaOH (2.65 moles) was heated to 100° C. A monomer solution containing 100 grams of acrylic acid (1.39 moles) was added to the reactor over a period of 1.5 hours. An initiator solution comprising of 6.6 grams of sodium persulfate in 30 grams of deionized water was simultaneously added to the reactor over a period of 2 hours. The reaction product was held at 100° C. for an additional period of 2 hours. The final product was a water white solution.

Example 6

Synthesis of Hybrid Copolymer

A reactor containing 25 grams of a 48% solution of gluconic acid solution and 25 grams of water was heated to 100° C. A monomer solution containing 238 grams of a 50% solution of sodium 2-acrylamido-2-methylpropane sulfonate (NaAMPS) (0.52 moles) was added to the reactor over a period of 1.5 hours. An initiator solution comprising of 6.2 grams of sodium persulfate in 100 grams of deionized water was simultaneously added to the reactor over a period of 2 hours. The reaction product was held at 100° C. for an additional period of 2 hours.

Example 7

Synthesis of Hybrid Copolymer

A reactor containing 50 grams of a 48% solution of gluconic acid solution was heated to 100° C. A monomer solution containing 238 grams of a 50% solution of sodium 2-acrylamido-2-methylpropane sulfonate (NaAMPS) (0.52 moles) was added to the reactor over a period of 1.5 hours. An initiator solution comprising of 6.2 grams of sodium persulfate in 100 grams of deionized water was simultaneously added to the reactor over a period of 2 hours. The reaction product was held at 100° C. for an additional period of 2 hours.

Example 8

Synthesis of Hybrid Copolymer

A reactor containing 23.8 grams of maltodextrin as a polysaccharide chain transfer agent (Cargill MD™ 01918, spray-dried maltodextrin obtained by enzymatic conversion of common corn starch, available from Cargill Inc., Cedar Rapids, Iowa) dissolved in 119 grams of water was heated to 100° C. A monomer solution containing 238 grams of a 50% solution of sodium 2-acrylamido-2-methylpropane sulfonate (NaAMPS) (0.52 moles) was added to the reactor over a period of 1.5 hours. An initiator solution comprising of 6.2 grams of sodium persulfate in 100 grams of deionized water was simultaneously added to the reactor over a period of 2 hours. The reaction product was held at 100° C. for an additional 2 hours. The final product was a clear orange solution. The solution was stable for over a year and did not exhibit any signs of crosslinking.

Example 9

Synthesis of Hybrid Copolymer 100 grams of maltodextrin as a polysaccharide chain transfer agent (Cargill MD™ 01918 dextrin, spray-dried maltodextrin obtained by enzymatic conversion of common corn starch, available from Cargill Inc., Cedar Rapids, Iowa) was initially dissolved in 135 grams of water in a reactor heated to 100° C. A monomer solution containing 108 grams of methacrylic acid was subsequently added to the reactor over a period of 1.5 hours. An initiator solution comprising of 6.2 grams of sodium persulfate in 28 grams of deionized water was added to the reactor at the same time as the monomer solution but over a period of 2 hours. The reaction product was held at 100° C. for an additional 2 hours. The polymer was then neutralized by adding 90.7 grams of a 50% solution of NaOH.

Example 10

Synthesis of Hybrid Copolymer

A reactor containing 50 grams of water was heated to 100° C. A solution containing 50 grams of acrylic acid, 25 grams of maltodextrin (Cargill MD™ 01960 dextrin, spray-dried maltodextrin obtained by enzymatic conversion of starch, available from Cargill Inc., Cedar Rapids, Iowa) as a polysaccharide chain transfer agent, and 60 grams of water was added to the reactor over a period of 45 minutes. An initiator solution comprising of 3.3 grams of sodium persulfate in 28 grams of deionized water was simultaneously added to the reactor over the same time frame. (It was noticed that if the initiator feed continued after the monomer feed, the reaction product became a crosslinked gel, which is undesirable in most cases.) The reaction product was held at 100° C. for an additional 2 hours. The polymer was then neutralized by adding 42.5 grams of a 50% solution of NaOH.

The final product was an homogenous amber solution that is stable for several months. In contrast, a blend of sodium polyacrylate (ALCOSPERSE® 602N polymer, available from Alco Chemical, Chattanooga, Tenn.) and maltodextrin (Cargill MD™ 01960 dextrin) separated out into phases in a period of less than 24 hours. Lack of phase separation in the final hybrid copolymer illustrates that the acrylic acid polymer is chemically bonded to the maltodextrin.

Example 10B

Synthesis of Hybrid Copolymer from Monomer Reduced in Reactivity

A reactor containing 75 grams of water and 27.8 grams of 50% NaOH was heated to 100° C. A solution containing 50 grams of acrylic acid, 25 grams of maltodextrin (Cargill MD™ 01960 dextrin) as a polysaccharide chain transfer agent, and 60 grams of water was added to the reactor over a period of 45 minutes. An initiator solution comprising of 3.3 grams of sodium persulfate in 28 grams of deionized water was simultaneously added to the reactor over a period of 60 minutes (extending addition of initiator feed beyond addition of the monomer feed). The reaction product was held at 100° C. for an additional hour. The polymer was a clear amber solution with no signs of crosslinking. This illustrates that crosslinking can be eliminated by reducing the reactivity of the monomer (here, by neutralizing the monomer during the reaction) (contra Example 10A, where the neutralizer was added after the reaction).

Example 10C

Synthesis of Hybrid Copolymer with Addition of Crosslinking Agent

A reactor containing 50 grams of water was heated to 100° C. A solution containing 50 grams of acrylic acid, 25 grams of maltodextrin (Cargill MD™ 01960 dextrin) as a polysaccharide chain transfer agent, and 60 grams of water was added to the reactor over a period of 45 minutes. An initiator solution comprising 3.3 grams of sodium persulfate in 28 grams of deionized water was simultaneously added to the reactor over a period of 60 minutes hours. After the monomer solution was added, the reaction product started to show signs of forming a crosslinked gel. At this point, 0.5 grams of isopropanol was added while addition of the initiator solution was continued. The reaction product returned to solution almost instantaneously. The reaction product was held at 100° C. for an additional hour. The polymer was then neutralized by adding 27.8 grams of a 50% solution of NaOH and 25 grams of water. The final product was a clear dark yellow solution. This illustrates that crosslinking noticed in Example 10A can be eliminated by addition of a conventional crosslinking agent such as isopropanol.

Example 11

Synthesis of Hybrid Copolymer Using Multiple Synthetic Monomers

A reactor containing 50 grams of water and 50 grams of glycerol as a chain transfer agent was heated to 85° C. A solution containing 25 grams of acrylic acid and 25 grams of styrene was added to the reactor over a period of 45 minutes. An initiator solution comprising of 3.3 grams of sodium persulfate in 30 grams of deionized water was simultaneously added to the reactor over a period of 60 minutes. The reaction product was held at 85° C. for an additional period of 2 hours. A solution of 28 grams of 50% NaOH and 53 grams of water was added to reactor over 60 minutes. The final product was an opaque yellow solution.

Example 12

Synthesis of Hybrid Copolymer Using Starch as Chain Transfer Agent

A reactor containing 50 grams of water was heated to 100° C. A solution containing 50 grams of acrylic acid, 25 grams of a degraded oxidized starch (low molecular weight starch with carboxylate groups) as a polysaccharide chain transfer agent, and 60 grams of water was added to the reactor over a period of 45 minutes. An initiator solution comprising of 6.2 grams of sodium persulfate in 28 grams of deionized water was simultaneously added to the reactor over a period of 45 minutes hours. (It was noticed that if the initiator feed continued after the monomer feed, the reaction product became a crosslinked gel, which is unusable.) The reaction product was held at 100° C. for an additional period of 2 hours. The polymer was then neutralized by adding 42.5 grams of a 50% solution of NaOH.

Example 13

Synthesis of Super Absorbents and Rheology Modifiers

A reactor containing 50 grams of water was heated to 100° C. A solution containing 50 grams of acrylic acid, 25 grams of maltodextrin (Cargill MD™ 01960) as a polysaccharide chain transfer agent, and 60 grams of water was added to the reactor over a period of 45 minutes. An initiator solution comprising of 3.3 grams of sodium persulfate in 28 grams of deionized water was simultaneously added to the reactor over a period of 60 minutes hours. A crosslinked gel is formed, which is undesirable in most cases. However, this type of material can be neutralized and spray dried. The spray dried product can be used as a super absorbent or rheology modifier.

Example 14

Dispersancy Evaluation

The polymers of Example 1 and 4 were evaluated in a clay suspension/dispersancy test. A control without any polymer was also tested. These materials were compared against a sodium polyacrylate sample (NaPAA) (ALCOSPERSE® 602N, available from Alco Chemical, Chattanooga, Tenn.). The samples were prepared by adding 2% clay (50:50 rose clay:bandy black clay) to deionized water. The samples were then stirred on a magnetic stir plate for 20 minutes, after which 0.1% active polymer was added and the samples were stirred for one minute more. The suspensions were then poured into 100 ml graduated cylinders and allowed to rest. FIG. 1 is a photograph of all polymers after a time period of one hour.

FIG. 1 indicates that the polymers of this invention are excellent dispersants. Furthermore, they are comparable in performance to synthetic polymers (NaPAA) typically used in this type of application.

Example 15

Anti-Redeposition

The polymers of this invention were tested for anti-redeposition properties in a generic powdered detergent formulation. The powdered detergent formulation was as follows:

| Ingredient | wt% |
| --- | --- |
| Neodol 25-7 | 10 |
| Sodium carbonate | 46 |
| Sodium silicate | 3 |
| Sodium sulfate | 40 |

The test was conducted in a full scale washing machine using 3 cotton and 3 polyester/cotton swatches. The soil used was 17.5 g rose clay, 17.5 g bandy black clay and 6.9 g oil blend (75:25 vegetable/mineral). The test was conducted for 3 cycles using 100 g powder detergent per wash load. The polymers were dosed in at 1.0 weight % of the detergent. The wash conditions used a temperature of 33.9° C. (93° F.), 150 ppm hardness and a 10 minute wash cycle.

L (luminance) a (color component) b (color component) values before the first cycle and after the third cycle was measured as $L_1$, $a_1$, $b_1$ and $L_2$, $a_2$, $b_2$, respectively, using a spectrophotometer. ΔE (color difference) values were then calculated using the equation below $$\Delta E = [(L_1-L_2)^2 + (a_1-a_2)^2 + (b_1-b_2)^2]^{0.5}$$

The data indicate that the polymers of this invention show anti-redeposition/soil suspension properties even at low concentrations in the wash liquor (a lower ΔE indicates better anti-redeposition properties).

TABLE 2

Effect on anti-redeposition/soil suspension

| | ΔE | | Delta Whiteness Index | |
| --- | --- | --- | --- | --- |
| Sample | Cotton | Poly/cotton | Cotton | Poly/cotton |
| Control (no polymer) | 1.87 | 1.59 | 6.67 | 5.86 |
| Example 3 | 1.29 | 0.82 | 4.48 | 3.06 |
| Example 8 | 1.35 | 0.98 | 4.88 | 3.63 |

Example 16

Hard Surface Cleaning Formulations

| Ingredient | wt % |
| --- | --- |
| Acid Cleaner | |
| Citric acid (50% solution) | 12.0 |
| Phosphoric acid | 1.0 |
| $C_{12}$-$C_{15}$ linear alcohol ethoxylate with 3 moles of EO | 5.0 |
| Alkyl benzene sulfonic acid | 3.0 |
| Polymer of Example 4 | 1.0 |
| Water | 78.0 |
| Alkaline Cleaner | |
| Water | 89.0 |
| Sodium tripolyphosphate | 2.0 |
| Sodium silicate | 1.9 |
| NaOH (50%) | 0.1 |
| Dipropylene glycol monomethyl ether | 5.0 |
| Octyl polyethoxyethanol, 12-13 moles EO | 1.0 |
| Polymer of Example 5 | 1.0 |

Example 17

Automatic Dishwash Powder Formulation

| Ingredients | wt % |
| --- | --- |
| Sodium tripolyphosphate | 25.0 |
| Sodium carbonate | 25.0 |
| C12-15 linear alcohol ethoxylate with 7 moles of EO | 3.0 |
| Polymer of Example 10A | 4.0 |
| Sodium sulfate | 43.0 |

Example 18

Water Treatment Compositions

Once prepared, the water-soluble polymers are preferably incorporated into a water treatment composition comprising the water-soluble polymer and other water treatment chemicals. Such other chemicals include corrosion inhibitors such as orthophosphates, zinc compounds and tolyl triazole. As indicated above, the level of the inventive polymer utilized in the water treatment compositions is determined by the treatment level desired for the particular aqueous system treated. The water treatment compositions generally comprise from 10 to 25 percent by weight of the water-soluble polymer. Conventional water treatment compositions are known to those skilled in the art and exemplary water treatment compositions are set forth in the four formulations below. These compositions containing the polymer of the present invention have application in, for example, the oil field.

| Formulation 1 | | Formulation 2 | |
| --- | --- | --- | --- |
| 11.3% | of Polymer of Ex. 9 | 11.3% | Polymer of Ex. 6 |
| 47.7% | Water | 59.6% | Water |
| 4.2% | HEDP | 4.2% | HEDP |
| 10.3% | NaOH | 18.4% | TKPP |
| 24.5% | Sodium Molybdate | 7.2% | NaOH |
| 2.0% | Tolyl triazole | 2.0% | Tolyl triazole |
| pH | 13.0 | pH | 12.64 |

| Formulation 3 | | Formulation 4 | |
| --- | --- | --- | --- |
| 22.6% | of Polymer of Ex. 12 | 11.3% | Polymer of Ex. 1 |
| 51.1% | Water | 59.0% | Water |
| 8.3% | HEDP | 4.2% | HEDP |
| 14.0% | NaOH | 19.3% | NaOH |
| 4.0% | Tolyl triazole | 2.0% | Tolyl triazole |
| pH | 12.5 | 4.2% | $ZnCl_2$ |
| | | pH | 13.2 | where HEDP is 1-hydroxyethylidene-1,1 diphosphonic acid and TKPP is tri-potassium polyphosphate.

Example 19

Cement Composition

Various quantities of the polymer produced as described in Example 1 above (9% by weight aqueous solution of the polymer) were added to test portions of a base cement slurry. The base cement composition included Lone Star Class H hydraulic cement and water in an amount of 38% by weight of dry cement. The base composition had a density of 16.4 pounds per gallon. These compositions containing the polymer of the present invention have application in, for example, the oil field.

Example 20

Automatic Non-Phosphate Dishwash Powder Formulation

| Ingredients | wt % |
| --- | --- |
| Sodium citrate | 30 |
| Polymer of Example 1 | 10 |
| Sodium disilicate | 10 |
| Perborate monohydrate | 6 |
| Tetraacetylethylenediamine | 2 |
| Enzymes | 2 |
| Sodium sulfate | 30 |

Example 21

Handwash Fabric Detergent

| Ingredients | wt % |
| --- | --- |
| Linear alkylbenzene sulfonate | 15-30 |
| Nonionic surfactant | 0-3 |
| Na tripolyphosphate (STPP) | 3-20 |
| Na silicate | 5-10 |
| Na sulfate | 20-50 |
| Bentonite clay/calcite | 0-15 |
| Polymer of Example 4 | 1-10 |
| Water | Balance |

Example 22

Fabric Detergent with Softener

| Ingredients | wt % |
| --- | --- |
| Linear alkylbenzene sulfonate | 2 |
| Alcohol ethoxylate | 4 |
| STPP | 23 |
| Polymer of Example 11 | 1 |
| Na carbonate | 5 |
| Perborate tetrahydrate | 12 |
| Montmorillonite clay | 16 |
| Na sulfate | 20 |
| Perfume, FWA, enzymes, water | Balance |

Example 23

Bar/Paste for Laundering

| Ingredients | wt % |
| --- | --- |
| Linear alkylbenzene sulfonate | 15-30 |
| Na silicate | 2-5 |
| STPP | 2-10 |
| Polymer of Example 10A | 2-10 |
| Na carbonate | 5-10 |
| Calcite | 0-20 |
| Urea | 0-2 |
| Glycerol | 0-2 |
| Kaolin | 0-15 |
| Na sulfate | 5-20 |
| Perfume, FWA, enzymes, water | Balance |

Example 24

Liquid Detergent Formulation

| Ingredients | wt % |
| --- | --- |
| Linear alkyl benzene sulfonate | 10 |
| Alkyl sulfate | 4 |
| Alcohol ($C_{12}$-$C_{15}$) ethoxylate | 12 |
| Fatty acid | 10 |
| Oleic acid | 4 |
| Citric acid | 1 |
| NaOH | 3.4 |
| Propanediol | 1.5 |
| Ethanol | 5 |
| Polymer of Example 11 | 1 |
| Ethanol oxidase | 5 u/ml |
| Water, perfume, minors | up to 100 |

Although the present invention has been described and illustrated in detail, it is to be understood that the same is by way of illustration and example only, and is not to be taken as a limitation. The spirit and scope of the present invention are to be limited only by the terms of any claims presented hereafter.

We claim:

1. A hybrid copolymer comprising:
   a synthetic polymer and
   a naturally derived hydroxyl containing chain transfer agent as the end group.

2. The copolymer of claim 1 wherein the synthetic polymer comprises a hydrophilic acid monomeric unit.

3. The copolymer of claim 2 wherein the hydrophilic monomeric unit is chosen from the group consisting of acrylic acid, methacrylic acid, itaconic acid, maleic acid, 2-acrylamido-2-methyl propane sulfonic acid, vinyl sulfonic acid, sodium methallyl sulfonate, sulfonated styrene, allyloxybenzene sulfonic acid and their salts.

4. The copolymer of claim 1 wherein the synthetic polymer comprises a hydrophobic monomeric unit and a hydrophilic acid monomeric unit.

5. The copolymer of claim 4 wherein the hydrophobic monomeric unit is chosen from the group consisting of styrene, α-methyl styrene, methyl methacrylate, methyl acrylate, 2-ethylhexyl acrylate, octyl acrylate, lauryl acrylate, stearyl acrylate, 2-ethylhexyl methacrylate, octyl methacrylate, lauryl methacrylate, stearyl methacrylate, behenyl methacrylate and octyl acrylamide.

6. The copolymer of claim 1 wherein the naturally derived hydroxyl containing chain transfer agent is chosen from the group consisting of glycerol, citric acid, lactic acid, tartaric acid, gluconic acid, glucoheptonic acid, monosaccharides, disaccharides, oligosaccharides and polysaccharides.

7. The copolymer of claim 6 wherein the polysaccharide is chosen from the group consisting of starch, cellulose, pectin, alginate, gellan, gums and modified starch.

8. The copolymer of claim 7 wherein the starch is chosen from the group consisting of maize, potato, tapioca, wheat, rice, pea, sago, oat, barley, rye and amaranth.

9. The copolymer of claim 8 wherein the starch is chosen from the group consisting of waxy starch, high amylose starch, maltodextrins and oxidized starch.

10. The copolymer of claim 7 wherein the modified starch modification is chosen from the group consisting of propylene oxide, ethylene oxide, octenylsuccinic anhydride acetic anhydride and 2,3-epoxypropyltrimethylammonium chloride.

11. The copolymer of claim 1 wherein the number average molecular weight is between 1,000 and 100,000.

12. The copolymer of claim 11 wherein the number average molecular weight is between 2,000 and 25,000.

13. A formulation comprising:
a hybrid copolymer and at least one adjunct ingredient, wherein the hybrid copolymer is a synthetic polymer and
a naturally derived hydroxyl containing chain transfer agent as the chain terminating moiety.

14. The formulation of claim 13 wherein the formulation is chosen from the group consisting of a cleaning, superabsorbent, fiberglass binder, rheology modifier, oil field, water treatment, dispersant and a cement formulation.

15. The formulation of claim 14 wherein the cleaning formulation is a detergent, fabric cleaner, automatic dishwashing detergent, glass cleaner, hard surface cleaner or a laundry detergent.

16. The formulation of claim 15 wherein the automatic dishwashing detergent is a non-phosphate formulation.

17. The formulation of claim 13 wherein the adjunct ingredient is chosen from the group consisting of water, surfactants, builders, phosphates, sodium carbonate, citrates, enzymes, buffers, perfumes, anti-foam agents, ion exchangers, alkalis, anti-redeposition materials, optical brighteners, fragrances, dyes, fillers, chelating agents, fabric whiteners, brighteners, sudsing control agents, solvents, hydrotropes, bleaching agents, bleach precursors, buffering agents, soil removal agents, soil release agents, fabric softening agent, opacifiers, water treatment chemicals, corrosion inhibitors, orthophosphates, zinc compounds, tolyltriazole, minerals, clays, salts, metallic ores, metallic oxides, talc, pigments, titanium dioxide, mica, silica, silicates, carbon black, iron oxide, kaolin clay, modified kaolin clays, calcium carbonate, synthetic calcium carbonates, fiberglass, cement and aluminum oxide.

18. A method of cleaning a surface, the method comprising a step of contacting the surface with a cleaning formulation comprising:
(a) an effective amount of hybrid copolymer comprising a synthetic polymer and
a naturally derived hydroxyl containing chain transfer agent as the chain terminating moiety and
(b) an adjunct ingredient.

19. The method of cleaning of claim 18 wherein the adjunct ingredient is selected from the group consisting of water, surfactants, builders, phosphates, sodium carbonate, citrates, enzymes, buffers, perfumes, anti-foam agents, ion exchangers, alkalies, anticorrosion materials, anti-redeposition materials, optical brighteners, fragrances, dyes, fillers, chelating agents, fabric whiteners, brighteners, sudsing control agents, solvents, hydrotropes, bleaching agents, bleach precursors, buffering agents, soil removal agents, soil release agents, fabric softening agent and opacifiers.

20. A method for controlling scale in an aqueous system, the method comprising introducing in to the aqueous system an effective amount of a hybrid copolymer comprising a synthetic polymer and
a naturally derived hydroxyl containing chain transfer agent as the chain terminating moiety.

21. The method of controlling scale of claim 20 wherein the scale controlled is carbonate, sulfate, phosphate or silicate based scales.

22. A method for dispersing particulates in an aqueous system, the method comprising adding to the aqueous system a hybrid copolymer in an amount sufficient to disperse the particulates wherein the hybrid copolymer comprises a synthetic polymer and a naturally derived hydroxyl containing chain transfer agent as the chain terminating moiety.

23. The method of dispersing particulates of claim 22 wherein the particulates are minerals, clays, salts, metallic ores, metallic oxides, dirt, soils, talc, pigments, titanium dioxide, mica, silica, silicates, carbon black, iron oxide, kaolin clay, calcium carbonate, synthetic calcium carbonates, precipitated calcium carbonate, ground calcium carbonate, precipitated silica, kaolin clay or combinations thereof.

24. The formulation of claim 13 wherein the copolymer is present at 0.001 percent to 25 percent of the total formulation weight.

25. The formulation of claim 24 wherein the copolymer is present between 0.5 percent and 5 percent of the total weight of the formulation.

26. The copolymer of claim 1 wherein the synthetic polymer is present at between 25 and 99.9 percent by weight of the copolymer.

* * * * *

UNITED STATES PATENT AND TRADEMARK OFFICE
CERTIFICATE OF CORRECTION

PATENT NO. : 7,666,963 B2  Page 1 of 1
APPLICATION NO. : 11/458180
DATED : February 23, 2010
INVENTOR(S) : Rodrigues et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 821 days.

Signed and Sealed this

Twenty-eighth Day of December, 2010

David J. Kappos
*Director of the United States Patent and Trademark Office*